UNITED STATES PATENT OFFICE.

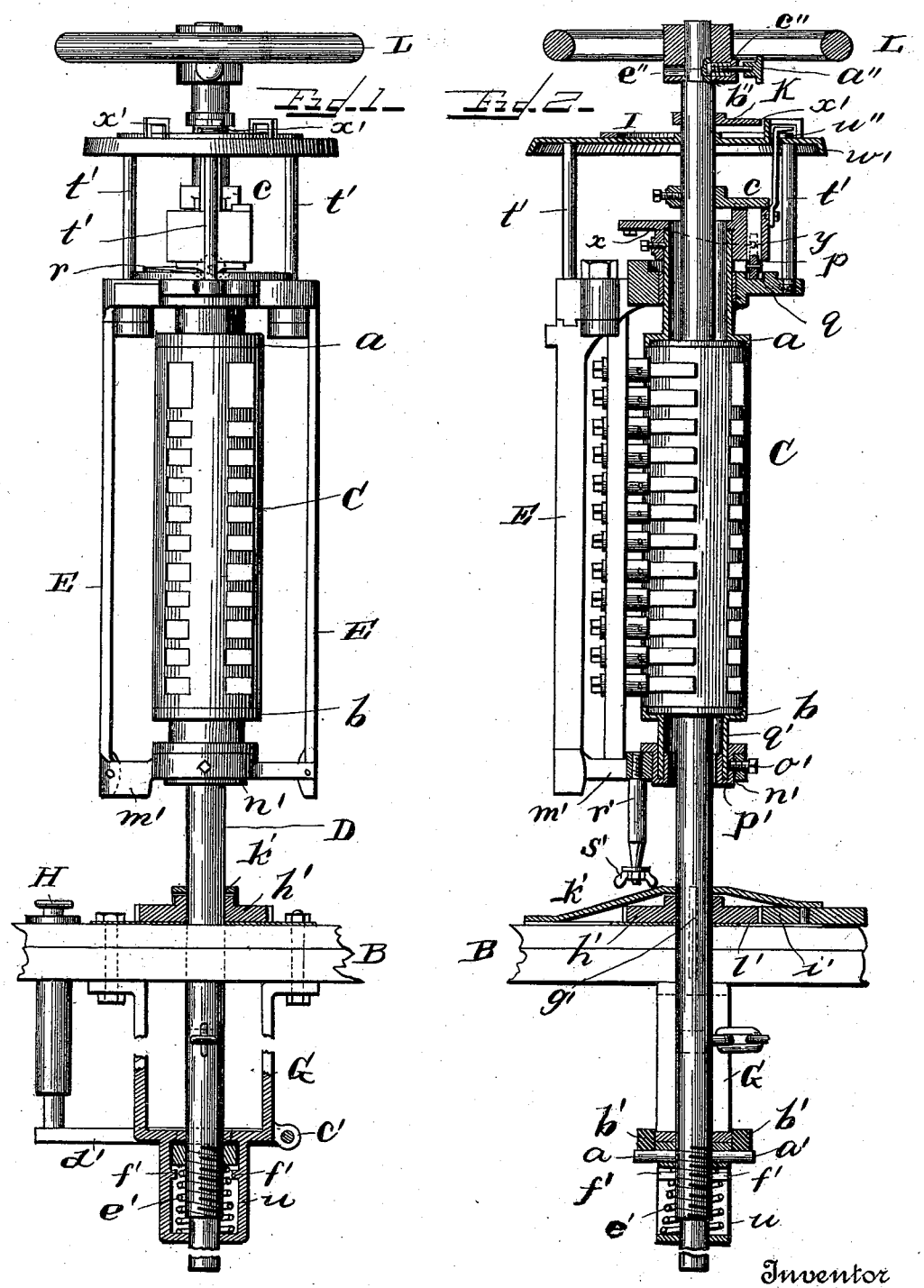

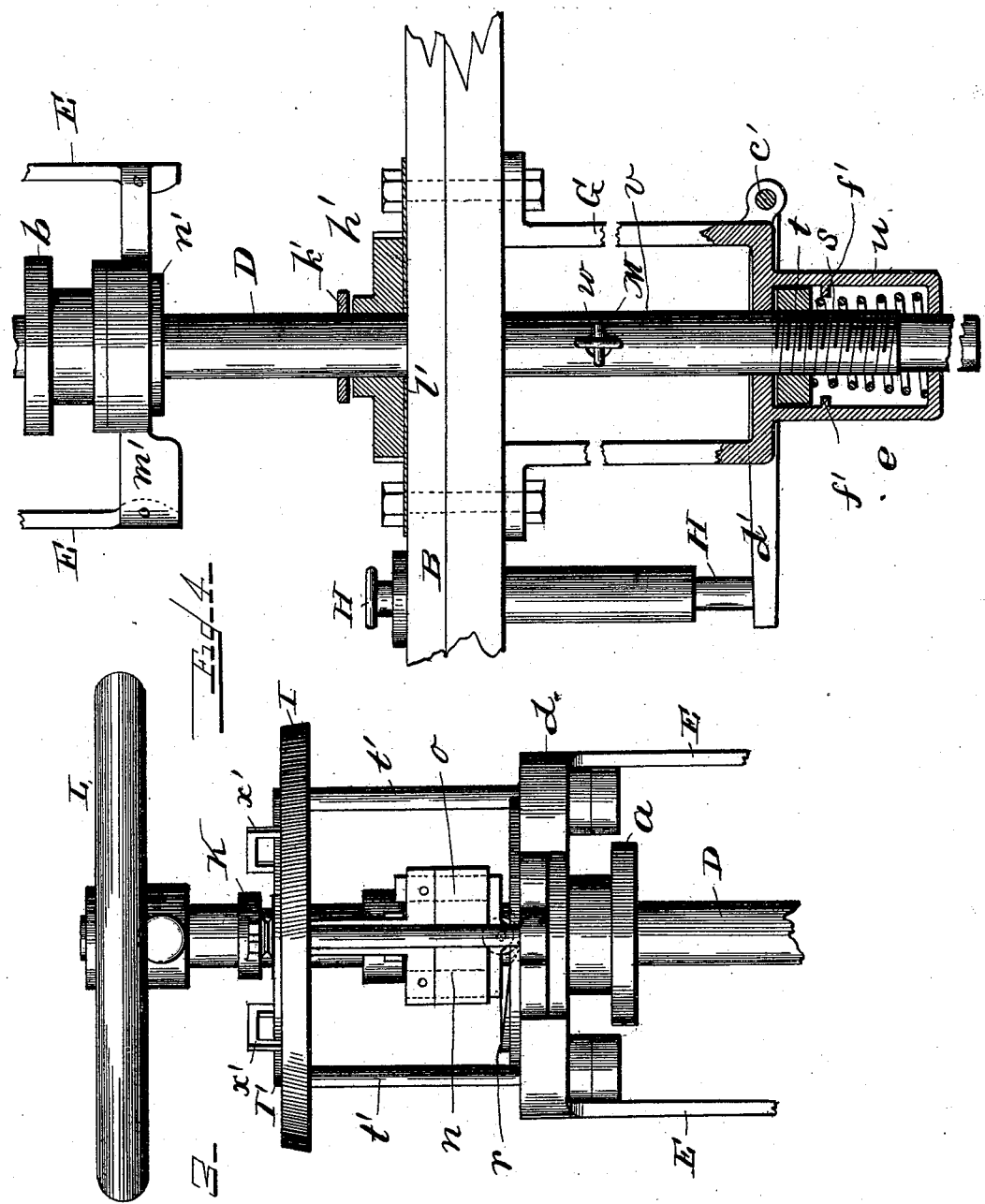

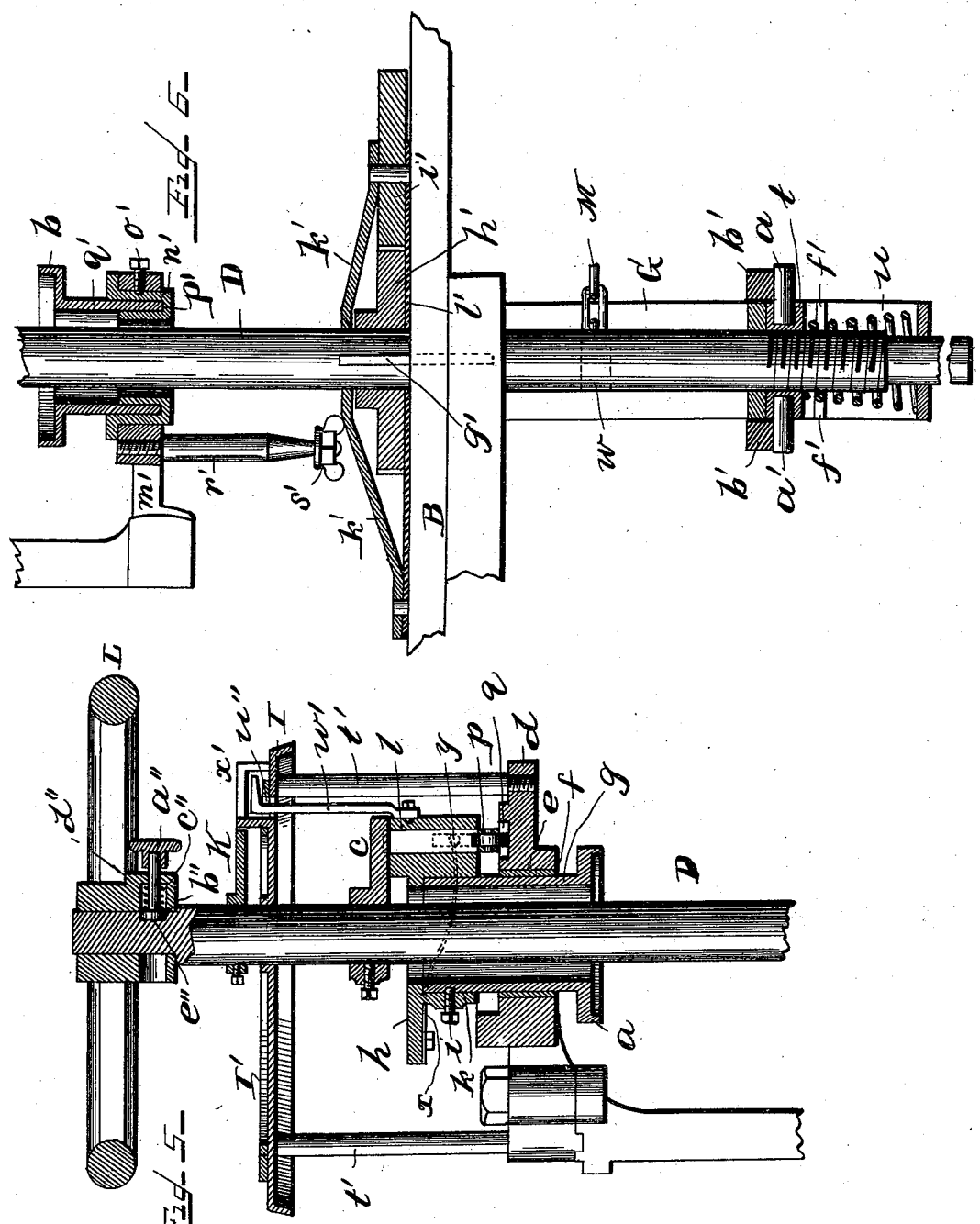

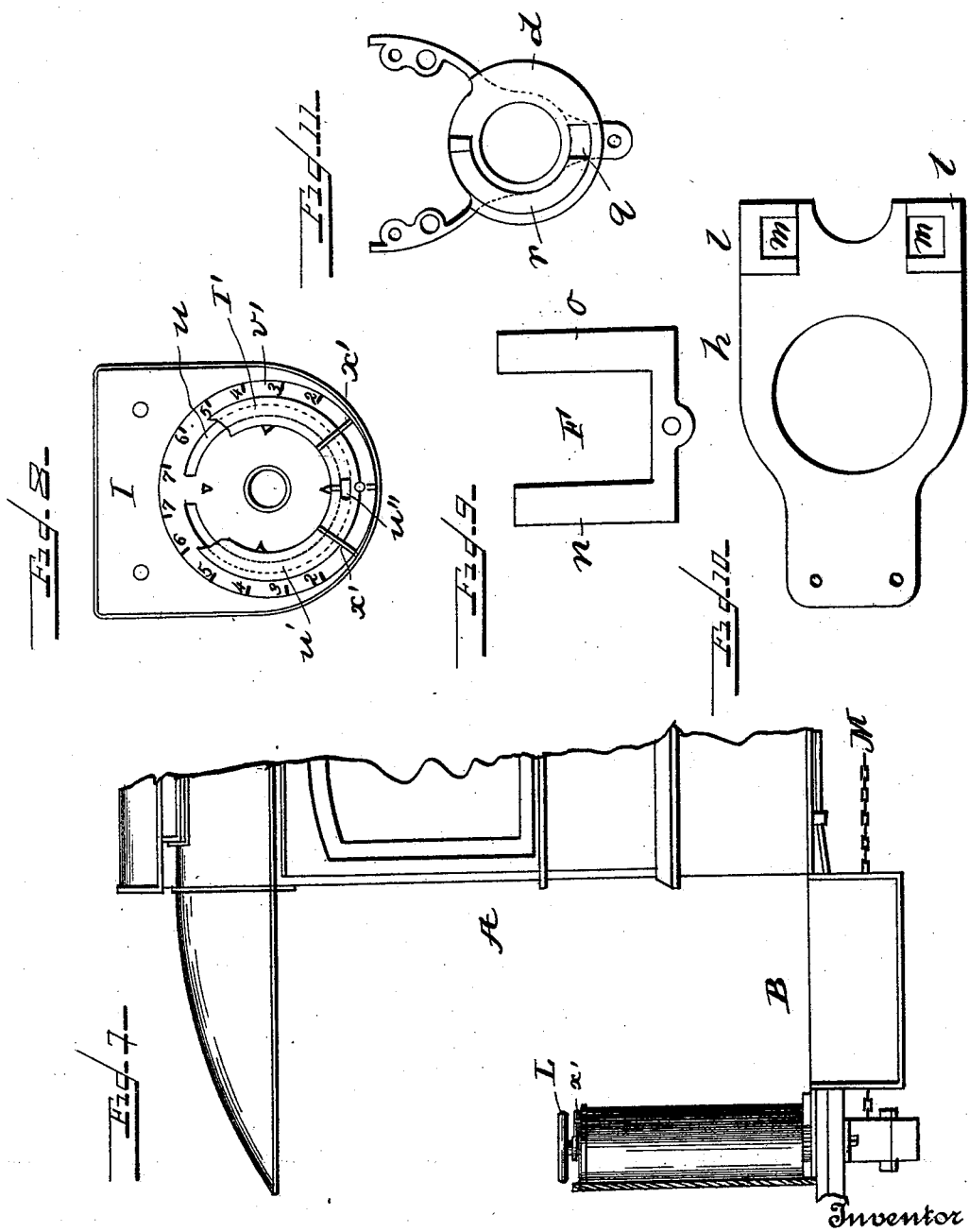

WILLIAM P. COLDREN, OF LEBANON, PENNSYLVANIA, ASSIGNOR OF TWO-THIRDS TO JACOB M. SHENK, OF SAME PLACE, AND WILLIAM H. CONRAD, OF READING, PENNSYLVANIA.

CONTROLLING DEVICE FOR ELECTRIC RAILWAY-CARS.

SPECIFICATION forming part of Letters Patent No. 506,001, dated October 3, 1893.

Application filed April 22, 1893. Serial No. 471,454. (No model.)

*To all whom it may concern:*

Be it known that I, WILLIAM P. COLDREN, a citizen of the United States, residing at Lebanon, in the county of Lebanon and State of Pennsylvania, have invented certain new and useful Improvements in Electric Railway-Cars; and I do hereby declare the following to be a full, clear, and exact description of the invention, such as will enable others skilled in the art to which it appertains to make and use the same.

My present invention relates to electric railway cars, and has for its object certain improvements in means for controlling the currents of electricity and operating the brake mechanism simultaneously by the use of a single shaft or lever. The devices employed afford ready and effective means for releasing the brakes and turning on the current and releasing the brakes or turning off the current and applying the brakes, or releasing the brakes and reversing the current. In either event the current and the brakes cannot be on at the same time, while the current and the brake are in full control of the motor-man, so that he can with one hand operate both and cause the car to run in either direction.

The invention will be fully disclosed in the following specification and claims.

In the accompanying drawings which form part of this specification—Figure 1 represents a rear elevation of my invention; Fig. 2 a side elevation; Figs. 3 and 4 rear elevations on an enlarged scale; Figs. 5 and 6 side elevations; Fig. 7 a side elevation of one end of a car with my invention applied; Fig. 8 a top plan view of the cover of the casing; Fig. 9 a side view of the yoke; Fig. 10 a top plan view of yoke-plate, and Fig. 11 a top plan view of the upper end of the frame.

Reference being had to the drawings and the letters thereon, A indicates one end of a car, Fig. 7; B the platform on which my combined brake and electric current controlling device is supported; C an electric switch or current controlling device which may be of any approved form and constitutes no part of my present invention, but for the purpose of illustration only, I have shown a form of switch described in Patent No. 447,230, of February 24, 1891, and shall not herein enter into a detailed description thereof. The switch C is supported between an upper head *a* and a lower head *b*, surrounds the shaft D, which passes through the switch-cylinder without coming in contact therewith, and is operated to turn the current of electricity on or off by means of an arm *c* secured to the shaft D, as will hereinafter more fully appear.

E indicates a frame, through the upper end *d* of which is a cylindrical opening *e* provided with a bushing *f*, and through the bushing extends the sleeve *g* of the head *a*, and on the upper end of the sleeve *g* rests a plate *h* and is secured thereto to revolve therewith by a set-screw *i*. The plate *h* is provided with a socket *k* on its lower side, into which the sleeve *g* extends, and on one end upon its upper side are lugs *l, l*, through which and the plate are openings *m, m*, into which the arms *n, o* of the yoke F extend and move vertically therein. To the lower end of the yoke is secured a wheel *p* upon which the yoke rests and travels on the upper surface of the upper end of the frame E, as the plate *h* is turned to the right or left to turn the current of electricity on or off. In turning the plate *h* to the right to turn on the current the arm *c* engages the long arm *o* of the yoke F and transmits motion to the heads *a* and *b* and turns the switch C on its axis and in turning off the current the arm *c* is turned to the left, engages the short arm *n* of the yoke and turns the switch on its axis in the opposite direction until the wheel *p* drops into the recess *q* in the upper surface of the end *d* of the frame E, at which point the current is off. When the wheel *p* is in the recess *q* the yoke F is depressed and the arms *n o* drawn down into the plate *p* by a bifurcated leaf spring *x*, which is secured to the under side of said plate at one end and engages pins *y* on the arms *n o* at the other end. To reverse the current and move the car in the opposite direction, the shaft D is turned in the opposite direction, or toward the left, the wheel *p* traveling upon an inclined track *r* on the upper surface of the end $d$ of the frame E, which track increases in height from nil at the recess $q$ to one fourth of an inch at its opposite end, the function of the incline being to project the arm $n$ of the yoke above the lug $l$ so that the arm $c$ can engage it to turn the switch C on its axis to put on the current, this projecting of the arm $n$ of the yoke being necessary for the reason that in this motion of the shaft D, it rises vertically by the left hand screw $s$ at the lower end of the shaft engaging the nut $t$ fixed against rotating in a cage $u$. It will be observed that in turning off the current when the car has been running forward the shaft D is revolved toward the left which winds the brake chain M around the shaft at $v$ where the chain is secured to the shaft in any approved manner, as by being passed through a transverse hole $w$ in the shaft, and that before the reverse current can be turned on the shaft D must be revolved in the opposite direction to release the brakes when the shaft is drawn down to bring the arm $c$ into engagement with the arm $n$ of the yoke. The shaft D is preferably drawn down by the foot of the motor-man to effect which the nut $t$ is provided with studs or pins $a'$ $a'$ upon which the arms $b'$ $b'$ of a bifurcated yoke rest. This yoke is pivotally connected at $c'$ to a frame G secured to the under side of the platform B, and is provided with an arm $d'$ upon which the lower end of the foot plunger H rests, while the upper end projects a little above the upper surface of the platform. The shaft D is supported upon a spring $e'$ in the cage $u$ and the downward movement is limited by lugs $f'$ $f'$ on the inside of the cage with which lugs the nut engages when the shaft has been sufficiently drawn down by the motor-man, and as soon as the motor-man takes his weight off the plunger H, the resiliency of the spring $e'$ raises the shaft D to its normal position to engage the long arm $o$ of the yoke to turn off the current.

To admit of the vertical movement of the shaft D, it is provided with an elongated spline $g'$ which engages a ratchet-wheel $h'$ which is provided with a pawl $i'$ to secure the brake rod D when the brakes have been applied; and to prevent the ratchet-wheel and the pawl rising with the shaft D, they are secured by a strap $k'$ properly bolted to the upper surface of the platform B.

To reduce friction, the ratchet-wheel and its pawl rest upon a metallic plate $l'$.

In the lower end $m'$ of the frame E is a bushing $n'$ secured therein by a set-screw $o'$ and said bushing is provided with an annular seat $p'$, to receive the lower end of the sleeve $q'$, of the head $b$ which supports the switch C and forms a bearing to support the weight of the switch, and from said end of the frame projects a bolt or rod $r'$ provided with a nut $s'$ to support the housing or inclosing casing (not shown) commonly used for the purpose.

Upon the upper end $d$ of the frame E is a head or cover I for the casing above referred to, supported upon posts $t'$, $t'$, $t'$ and in said head is a concentric slot $u'$, Fig. 8, outside of which is a right and left graduated scale $v'$, and from the plate $h$ projects an index or pointer $w'$ which extends through said slot to indicate the power applied to the car. To strengthen the cover braces $x'$ $x'$ are provided to cross the slot and tie the separated parts inside and outside the slot. The slot $u'$ is preferably covered by an annular plate I' which is provided with a slot $u''$ for the arm of the pointer $w'$ to project through and said plate moves with the pointer.

Upon the shaft D and above the cover I is secured a pointer K to indicate the direction in which the shaft is being revolved to apply or release the brakes. The brakes may be of any approved form.

L indicates a hand-wheel detachably secured to the upper end of the brake-shaft D by means of a pin $a''$ having a head $b''$ provided with a coiled spring $c''$ in a chamber $d''$ to press the head $b''$ into the recess $e''$ in the shaft. To release the wheel the pin is drawn outward into the chamber $d''$ when the wheel may be detached from the brake-shaft at one end of the car and carried to the opposite end to run the car in the reverse direction.

By the construction shown the brakes are operated and the current of electricity turned on and off and reversed and the car run in either direction by the manipulation of one shaft.

Having thus fully described my invention, what I claim is—

1. In an electrical car, the combination of an electrical switch, a frame in which the switch-cylinder is revolubly supported, a brake-shaft passing through the switch-cylinder, heads engaging the switch-cylinder, and connections between the upper head and the brake-shaft.

2. In an electrical car, the combination of an electrical switch, a frame in which the switch-cylinder is revolubly supported, a brake-shaft passing through the switch-cylinder, heads engaging the switch-cylinder, a plate attached to the upper end of the upper head, a yoke in said plate and an arm secured to the brake-shaft and engaging said yoke.

3. In an electrical car, the combination of an electrical switch, a frame in which the switch-cylinder is supported at both ends in suitable heads, a plate secured to the upper head, a yoke in said plate resting upon the upper end of the frame, a brake-shaft passing through the switch-cylinder and a connection between the brake-shaft and said plate.

4. In an electrical car, the combination of an electrical switch, a frame in which the switch-cylinder is supported in suitable heads, a plate secured to the upper head, a vertically movable yoke in said plate resting upon the upper end of the frame, a recess and a track on said upper end of the frame a brake-shaft passing through the switch-cylinder, and a connection between the shaft and the plate.

5. In an electrical car, the combination of an electrical switch, a frame in which the switch-cylinder is revolubly supported, a brake-shaft passing through the switch-cylinder, connections between said shaft and cylinder, a disk provided with a concentric slot and a graduated scale, and an indicator extending through said slot.

6. In an electrical car, a combined brake and current controlling device having a cover provided with a concentric slot, right and left graduated scales and an indicator extending through said slot.

7. In an electrical car, a combined brake and current controlling device comprising an electrical switch, a brake-shaft a spring supporting said shaft and means for compressing the spring to draw down the shaft.

8. In an electrical car, a combined brake and current controlling device comprising an electrical switch, a vertically movable brake-shaft passing through the switch-cylinder, a nut engaging the shaft, a spring supporting said shaft, and a yoke and plunger to draw down the shaft.

9. In an electric car, the combination of an electrical switch, a frame having a bushing in its lower end provided with an annular seat, a head having a sleeve resting in said bushing and engaging the lower end of the switch-cylinder, a head engaging the upper end of said cylinder, extending through the upper end of the frame, a plate, a yoke in said plate, a brake shaft and connection between said shaft and switch.

In testimony whereof I affix my signature in presence of two witnesses.

WILLIAM P. COLDREN.

Witnesses:
PETER HAUER,
GEO. I. HAUER.